(12) United States Patent
Taylor et al.

(10) Patent No.: US 10,208,453 B2
(45) Date of Patent: Feb. 19, 2019

(54) METHODS AND SYSTEMS FOR MONITORING WORK ZONE IN WORKSITE

(71) Applicant: Caterpillar Inc., Peoria, IL (US)

(72) Inventors: Michael A. Taylor, Wexford, PA (US); Steven E. Empson, East Peoria, IL (US); Mo Wei, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 98 days.

(21) Appl. No.: 15/596,394

(22) Filed: May 16, 2017

(65) Prior Publication Data
US 2018/0334783 A1 Nov. 22, 2018

(51) Int. Cl.
*E02F 3/84* (2006.01)
*E21C 41/26* (2006.01)

(52) U.S. Cl.
CPC .............. *E02F 3/844* (2013.01); *E21C 41/26* (2013.01)

(58) Field of Classification Search
None
See application file for complete search history.

(56) References Cited

U.S. PATENT DOCUMENTS

| 5,768,810 A * | 6/1998 | Ahn ................... E02F 3/436 37/348 |
| 8,639,393 B2 | 1/2014 | Taylor et al. |
| 9,297,147 B1 | 3/2016 | Wei et al. |
| 9,360,334 B2 | 6/2016 | Wei et al. |
| 2004/0020083 A1* | 2/2004 | Staub ................. E02F 9/26 37/348 |
| 2012/0139325 A1 | 6/2012 | Norberg et al. |
| 2016/0201298 A1 | 7/2016 | Taylor et al. |

FOREIGN PATENT DOCUMENTS

| WO | 2008118027 | 10/2008 |
| WO | 2016033634 | 3/2016 |

* cited by examiner

*Primary Examiner* — Richard M Camby (57) ABSTRACT

A method for monitoring a work zone in a worksite is disclosed. The work zone includes an overburden region, a dump region having an incline of positive slope, and an initial pivot point at a junction of the overburden region and the incline. The method includes monitoring, by a controller, an elevation of the work zone based on an elevation data received from one or more sensors. Further, the method comprises detecting, by the controller, a location in the work zone having an elevation lower than an elevation of the initial pivot point based on the elevation data. Furthermore, the method comprises updating, by the controller, the detected location as a new pivot point if the detected location is within a predetermined distance from the initial pivot point.

17 Claims, 9 Drawing Sheets

METHODS AND SYSTEMS FOR MONITORING WORK ZONE IN WORKSITE

TECHNICAL FIELD

The present disclosure, in general, relates to a worksite. More specifically, the present disclosure relates to methods and systems for monitoring a work zone in a worksite.

BACKGROUND

A typical worksite, such as a mining worksite, may include one or more features, such as high walls, valleys, inclined paths, low walls, etc, which develop over time during the mining operation. For example, to mine out/excavate mineral ores, such as coal, earth material overlying the mineral ore (typically known as an overburden region) is removed and is deposited in a dump region. This overburden removal and dumping may result in an incline (having a positive slope) in the dump region. The junction of the incline and the overburden region is typically known as a pivot point.

To move the material from the overburden region to the dump region, various machines such as dozers are used. A typical dozer has a blade that is used to scrape off the earth material in the overburden region and push it in the dump region. In certain scenarios, during the pushing operation, the blade of the dozer may get stuck at the pivot point where the incline begins (due sudden change in the elevation at the pivot point).

To avoid the aforementioned problem, the blade of the dozer is usually lifted before even the machine reaches the pivot point. However, lifting of the blade leads to shedding of the earth material around the pivot point, which may further lead to shifting of the point from where the incline begins. Such shifting of the start point of the incline may again cause the blade to get stuck.

WO2016033634 discloses a method to design a pit in a diamond pattern with a series of blocks that are not in a straight advancing face. The use of the diamond pattern reduces the amount of waste rock being moved into a lower or higher position. Furthermore, the diamond pattern provides the advantage that waste rock needs to be pushed at a comparatively shorter distance.

SUMMARY

Various aspects of the present disclosure disclose a method for monitoring a work zone in a worksite. The work zone includes an overburden region, a dump region having an incline of positive slope, and an initial pivot point at a junction of the overburden region and the incline. The method includes monitoring, by a controller, an elevation of the work zone based on an elevation data received from one or more sensors. Further, the method comprises detecting, by the controller, a location in the work zone having an elevation lower than an elevation of the initial pivot point based on the elevation data. Furthermore, the method comprises updating, by the controller, the detected location as a new pivot point if the detected location is within a predetermined distance from the initial pivot point.

Various aspects of the present disclosure disclose a method for operating a machine in a work zone in a worksite. The work zone including an overburden region, a dump region having an incline of positive slope, and an initial pivot point at a junction of the overburden region and the incline. The method includes manipulating, by a controller in the machine, an implement of the machine at a predefined distance from the initial pivot point, to compensate for an elevation of the incline. Further, the method includes monitoring, by the controller, an elevation of the work zone based on an elevation data received from one or more sensors positioned on the machine. Furthermore, the method includes detecting, by the controller, a location in the work zone having an elevation lower than an elevation of the initial pivot point based on the elevation data. The method further includes updating, by the controller, the detected location as a new pivot point if the detected location is within a predetermined distance from the initial pivot point. Additionally, the method includes manipulating, by the controller, the implement at the predefined distance from the new pivot point.

Various aspects of the present disclosure disclose a system for monitoring a work zone in a worksite. The work zone including an overburden region, a dump region having an incline of positive slope, and an initial pivot point at a junction of the overburden region and the incline. The system includes one or more sensors configured to measure an elevation data of the work zone. The system further includes a controller, communicably coupled to the one or more sensors. The controller is configured to monitor an elevation of the work zone based on the elevation data. The controller is further configured to detect a location having an elevation lower than an elevation of the initial pivot point, based on the elevation data. Furthermore, the controller is configured to update the detected location as a new pivot point if the detected location is within a predetermined distance from the initial pivot point.

DETAILED DESCRIPTION

Figure 1:
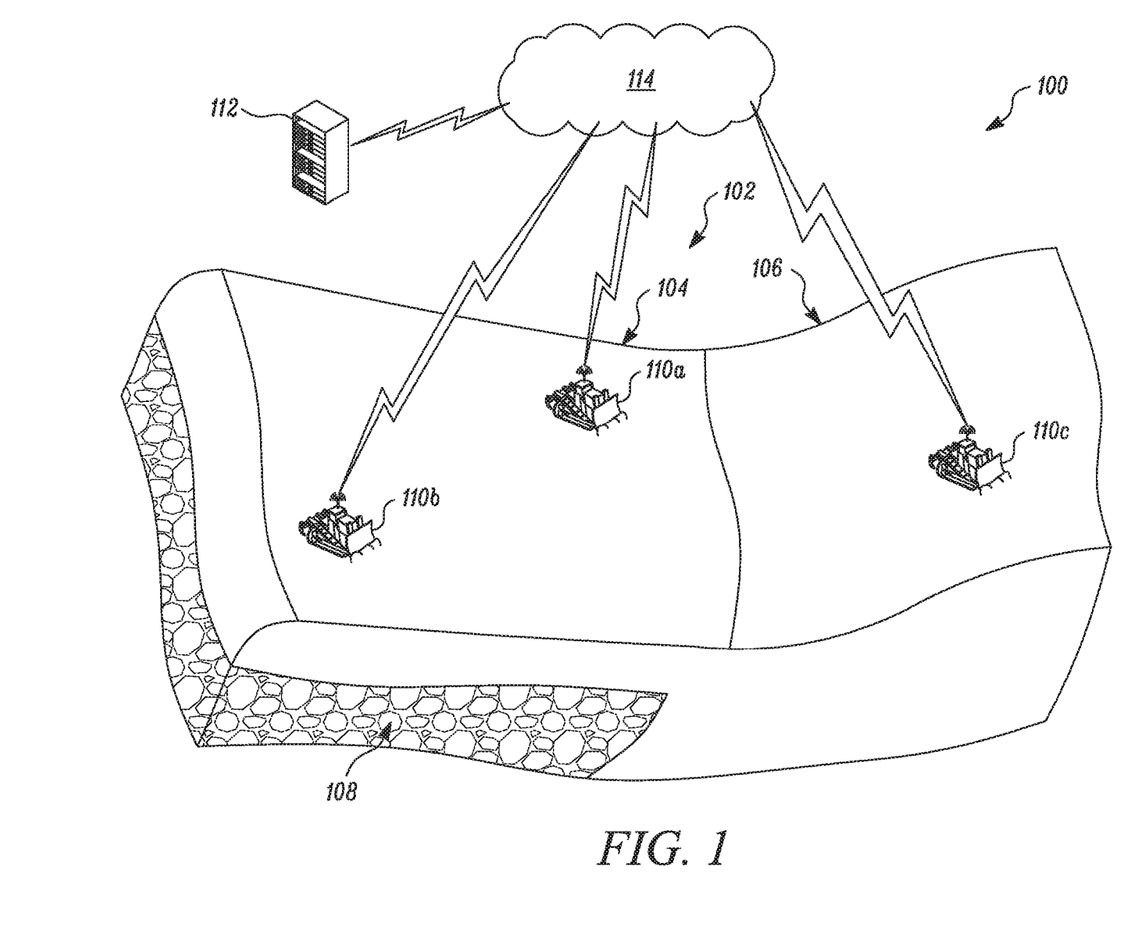
FIG. 1 illustrates an exemplary worksite, in accordance with the concepts of the present disclosure.
Figure 2:
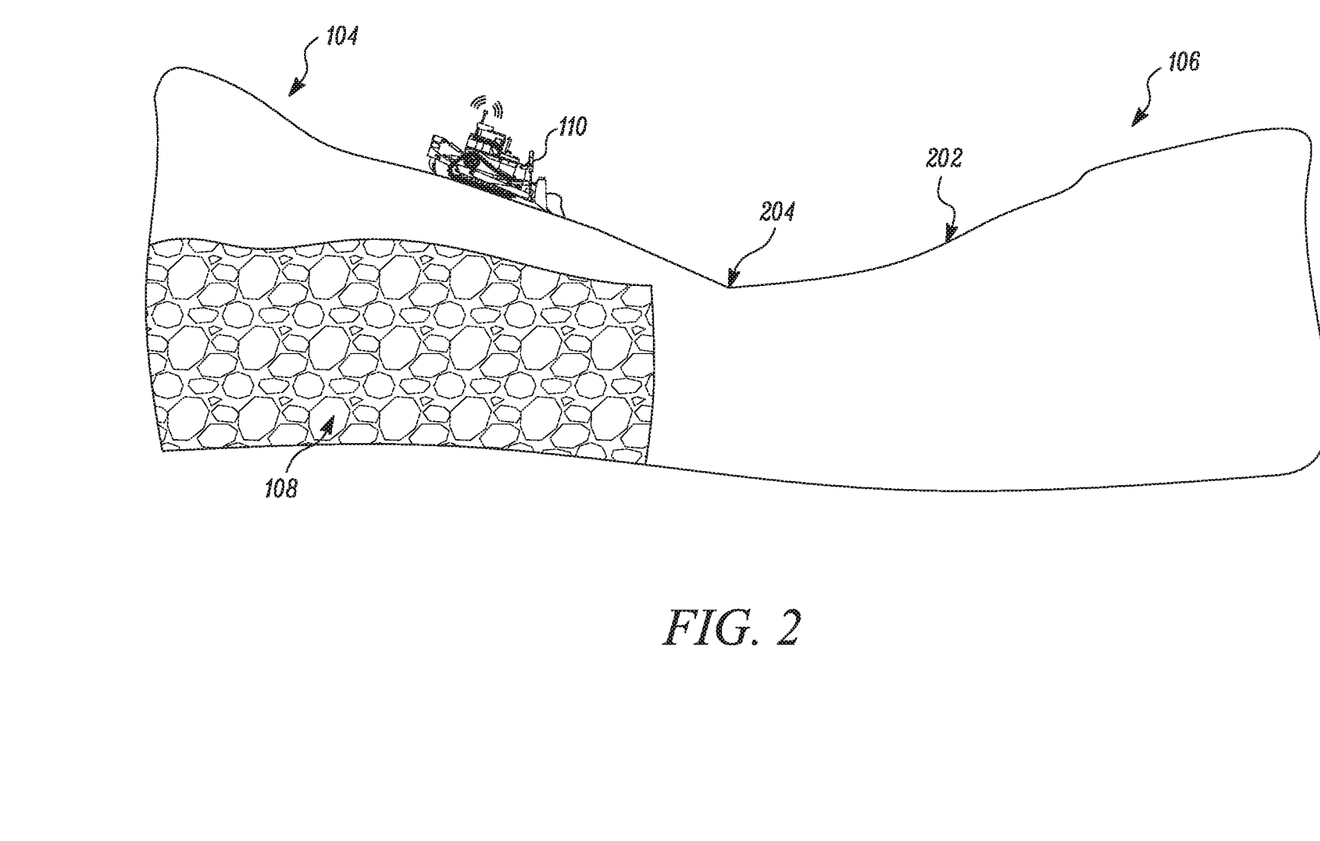
FIG. 2 illustrates a machine operating in the exemplary worksite, in accordance with the concepts of the present disclosure.

Referring to FIG. 1 and FIG. 2, an exemplary worksite 100 is illustrated. In an embodiment, the worksite 100 may correspond to a mining site, a construction site, or any other worksite where a machine is used to perform a task. For the purpose of the ongoing description, the worksite 100 is described and depicted as a mining site. However, the scope of the disclosure should not be limited to the worksite 100 as the mining site.

The worksite 100 may be divided into one or more work zones (for example the work zone 102), based on a type of operation being performed in a particular work zone. For example, in the work zone 102, the operation of extracting mineral ore is performed. For the sake of brevity, the worksite 100 has been illustrated to include only one work zone 102. However, a person having ordinary skill the art would appreciate that the worksite 100 may include more than one work zone. The work zone 102 may have an overburden region 104, and a dump region 106. The overburden region 104 may correspond to a region where earth material lays on top of a mineral ore layer 108. The dump region 106 corresponds to a region where the earth material (removed out of the overburden region 104) is deposited. The operation of removing the earth material from the overburden region 104 and depositing the earth material in the dump region 106, modifies the terrain of the work zone 102 to define one or more features in the work zone 102. For example, due to depositing of the earth material in the dump region 106, an incline 202 (FIG. 2), with a positive slope, may be formed in the dump region 106. The process of formation of the incline 202 has been described in greater detail below in conjunction with FIGS. 6-9.

In an embodiment, a junction where the overburden region 104 meets the incline 202 may be referred to as a pivot point 204. In another embodiment, the pivot point 204 may correspond to a location from which the positive slope of the incline 202 begins. Therefore, the pivot point 204 may correspond to a location on the incline 202 having a lowest elevation in comparison to the elevation of the other locations on the incline 202. For the purpose of ongoing description, the pivot point 204 has been considered as an initial pivot point. In an embodiment, the initial pivot point corresponds to a first pivot point that gets defined when the incline 202 is formed in the dump region 106. Hereinafter, the pivot point 204 has been interchangeably referred to as the initial pivot point 204.

In an embodiment, the operation of depositing the earth material in the dump region 106 is performed by one or more machines 110a, 110b, and 110c (hereinafter referred to as the machine 110). In an embodiment, the machine 110 is configured to remove the earth material from the overburden region 104 and deposit the earth material in the dump region 106. In an embodiment, the machine 110 may include one or more implements that enable the machine 110 to remove and deposit the earth material in the dump region 106. The machine 110 may be a fully autonomous machine, a semi-autonomous machine, or a manually operable machine. Some examples of the machine 110 may include, but are not limited to, excavators, dump trucks, dozers, and/or any other machine that is capable of removing and depositing the earth material. For the purpose of ongoing description, the machine 110 has been depicted and described as a dozer. However, a person having ordinary skill in the art would appreciate that the scope of the disclosure should not be limited to the machine 110 as the dozer. The machine 110 has been further described in conjunction with FIG. 3.

In an embodiment, the operation of the machine 110 in the worksite 100 may be monitored and controlled through a remote server 112. The remote server 112 may transmit/receive data from the machine 110 over a communication network 114 in order to monitor or control the machine 110. The remote server 112 may be implemented using any known application server such as, for example, Apache Application Server™, IBM Web Sphere™, and/or the like.

Figure 3:
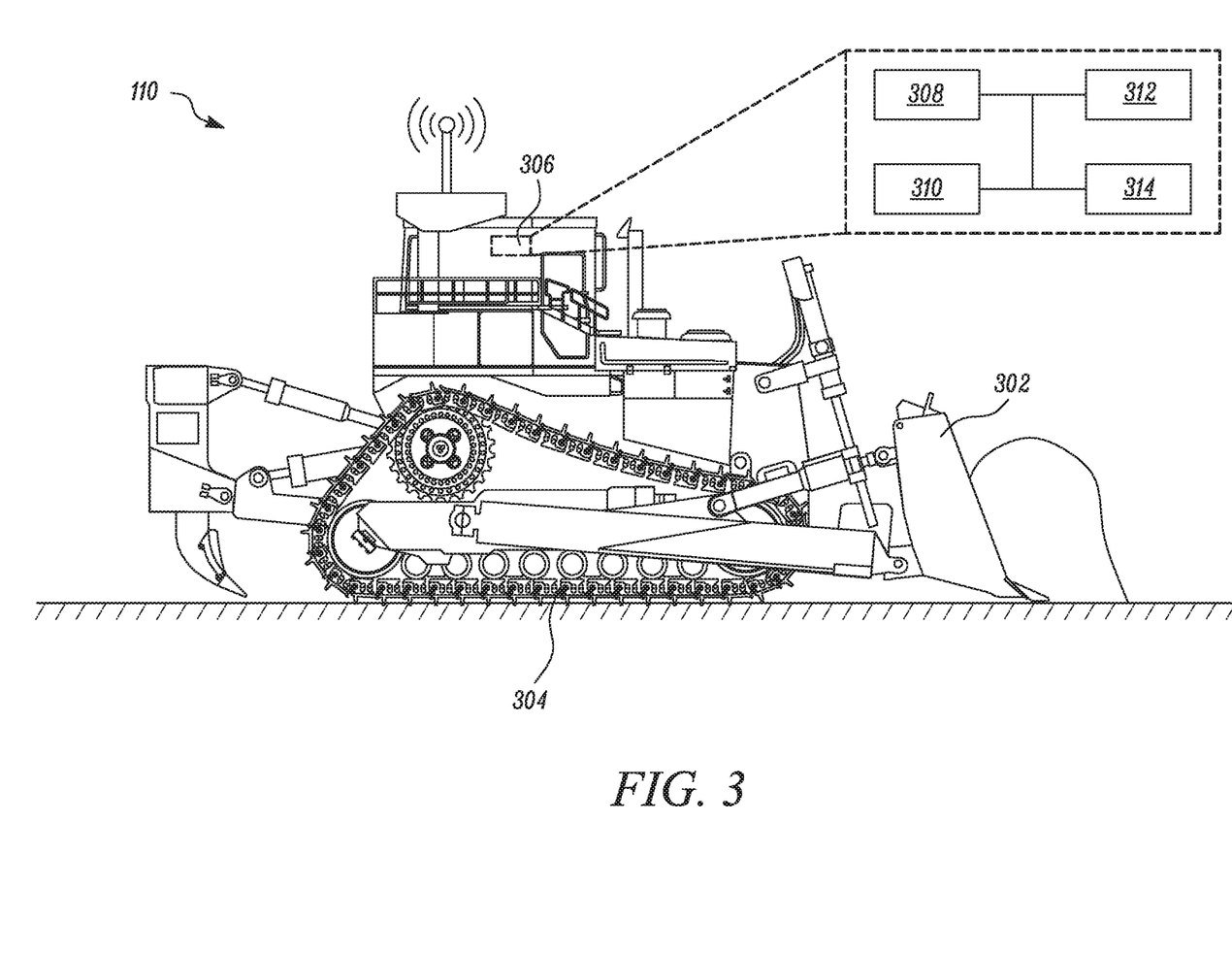
FIG. 3 illustrates a diagrammatic illustration of the machine, in accordance with the concepts of the present disclosure.

Referring to FIG. 3, a diagrammatic illustration of the machine 110 is provided. The machine 110 corresponds to a dozer that includes an implement 302, traction devices 304, and a machine control system 306.

The implement 302 may correspond to a blade that is connected to a frame of the machine 110 through one or more actuators. In an embodiment, the implement 302 may be utilized to carry, push, or otherwise move the earth material (removed from the overburden region 104) from one place to another. In an embodiment, the traction devices 304 coupled to the machine 110 may enable the machine 110 to move the earth material (in the implement 302) from one place to another. As illustrated in FIG. 3, the machine 110 includes a set of crawler tracks, however, the scope of the disclosure should not be limited to the traction devices 304 being the set of crawler tracks. It may be contemplated that the traction devices 304 may correspond to any component that enables the machine 110 to move the earth material from one place to another In an embodiment, the motion of the implement 302 and the traction devices 304 may be controlled by the machine control system 306. The machine control system 306 includes suitable logic, circuitry, and/or interfaces that are configured to control the various operations of the machine 110 in the work zone 102. Additionally, the machine control system 306 may be configured to monitor the work zone 102, and accordingly, control the operation of the machine 110. The machine control system 306 further includes a controller 308, a memory device 310, a transceiver 312, and one or more sensors 314. A person having ordinary skill in the art would appreciate that the scope of the disclosure is not limited to include the machine control system 306 in the machine 110. In an embodiment, the machine control system 306, or portions of the machine control system 306, may be included in the remote server 112, without departing from the scope of the disclosure.

In an embodiment, the controller 308 is communicably coupled to the memory device 310, the transceiver 312, and the one or more sensors 314. The controller 308 is configured to execute the instruction stored in the memory device 310 to perform predetermined operation. For example, the controller 308 may be configured to control the operation of the machine 110 in the work zone 102. The controller 308 may be implemented using one or more controller technologies such as an Application Specific Integrated Circuit (ASIC).

The memory device 310 stores a set of instructions that are executable by the controller 308 to perform the predetermined operation (for example, controlling the operation of the machine 110). Some of the commonly known memory device implementations include, but are not limited to, a random access memory (RAM), a read only memory (ROM), a hard disk drive (HDD), and a secure digital (SD) card.

The transceiver 312 transmits and receives messages and data to/from various devices/machines operating in the worksite 100 (e.g., the remote server 112) over the network 118. The transceiver 312 transmits and receives data/messages in accordance with the various communication protocols, such as, TCP/IP, UDP, and 2G, 3G, or 4G communication protocols.

The one or more sensors 314 are positioned in the machine 110 and are communicably coupled to the controller 308. The one or more sensors 314 are utilized to monitor an elevation of the terrain of the work zone 102. Further, the one or more sensors 314 transmit data pertaining to the elevation of the terrain of the work zone 102 to the controller 308. Examples of the one or more sensors 314 may include, but not limited to, accelerometer, gyroscope, a geo positioning system (GPS) sensor, a light detection and ranging (LIDAR) sensor, a perception sensor, a mono camera sensor, a stereo camera sensor, or a three-dimensional (3D) radar sensor.

In operation, the controller 308 is configured to operate the machine 110 in the work zone 102 to carry the earth material (removed from the overburden region 104) to the dump region 106. During traversal of the machine 110, the controller 308 is configured to lift the implement 302 at a predetermined distance from the initial pivot point 204 to compensate for the change in the elevation of the incline 202 in the dump region 106. The lifting of the implement 302 causes the earth material (present in the implement 302) to shed around the initial pivot point 204, which may further lead to shifting of the start point of the incline 202.

To detect whether the start point of the incline 202 has shifted, the controller 308 is configured to instruct the one or more sensors 314 to monitor the elevation of the terrain of the work zone 102. The one or more sensors 314 transmit the data pertaining to the elevation of the terrain (hereinafter interchangeably referred to as an elevation data) of the work zone 102 to the controller 308. Thereafter, the controller 308 is configured detect a location in the work zone having an elevation lower than an elevation at the initial pivot point 204 based on the elevation data. Subsequently, the controller 308 updates the detected location as a new pivot point, if the detected location is within a predetermined distance from the initial pivot point 204. In an embodiment, the new pivot point may correspond to the shifted start point of the incline 202. Further, the controller 308 operates the machine 110 in accordance with the new pivot point. The operation of the controller 308 has been further described in conjunction with the flowcharts illustrated in FIGS. 4-5 and exemplary scenario illustrated in FIGS. 6-9.

INDUSTRIAL APPLICABILITY

Figure 4:
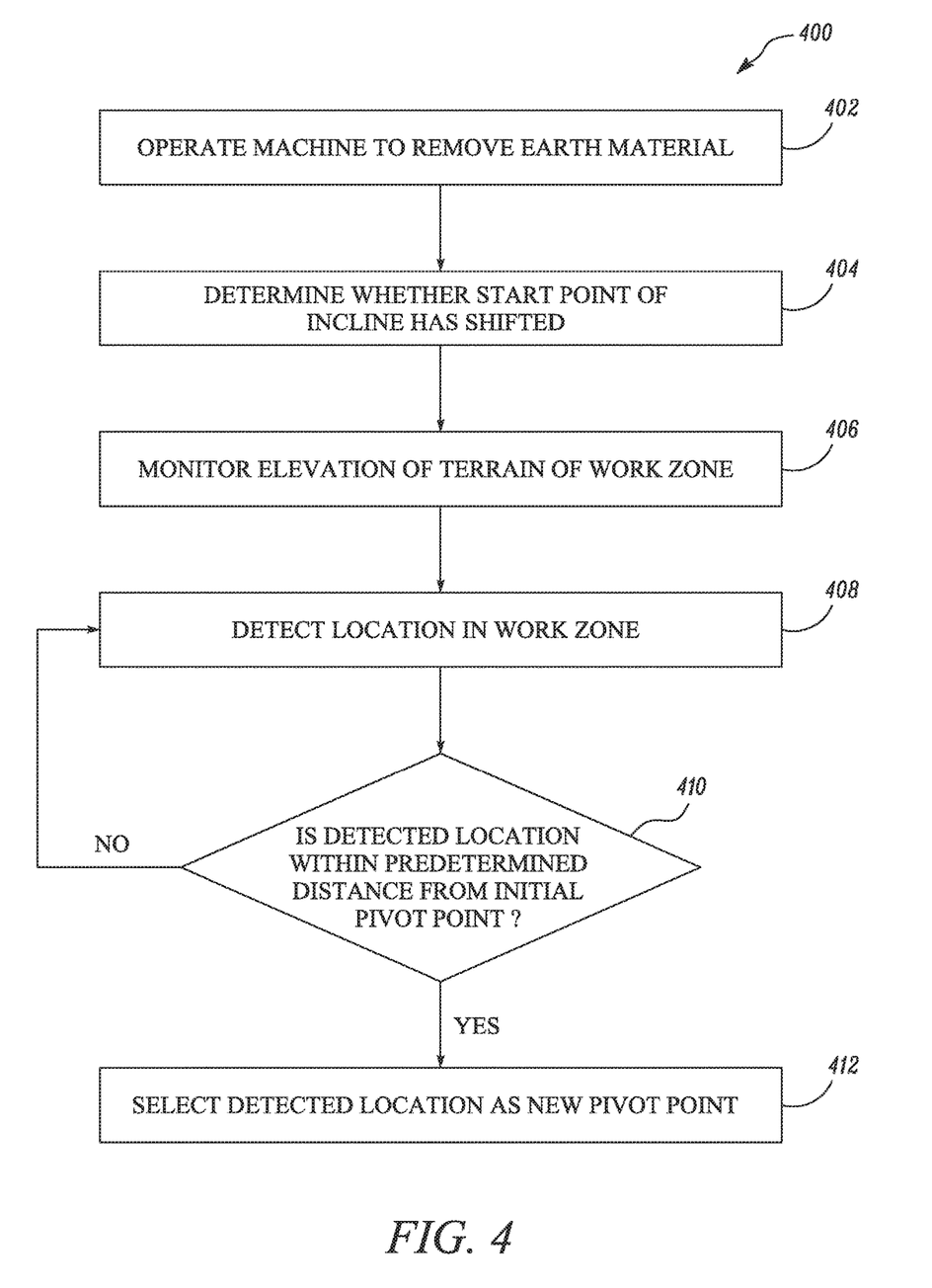
FIG. 4 illustrates a flowchart of a method for operating the machine in the worksite, in accordance with the concepts of the present disclosure.

Referring to FIG. 4, a flowchart 400, is illustrated. The flowchart 400 illustrates a method for operating the machine 110 in the worksite 100. The flowchart 400 has been described in conjunction with FIGS. 6-9.

At step 402, the machine 110 is operated to remove the earth material from the overburden region 104 and deposit the earth material in the dump region 106. For example, the controller 308 is configured to operate the machine 110. The controller 308 is configured to generate a signal that actuates the implement 302 to remove the material from the overburden region 104. Thereafter, the controller 308 may actuate the traction devices 304 to push or carry the earth material with the implement 302 to the dump region 106. The earth material is deposited in the dump region 106.

Figure 6:
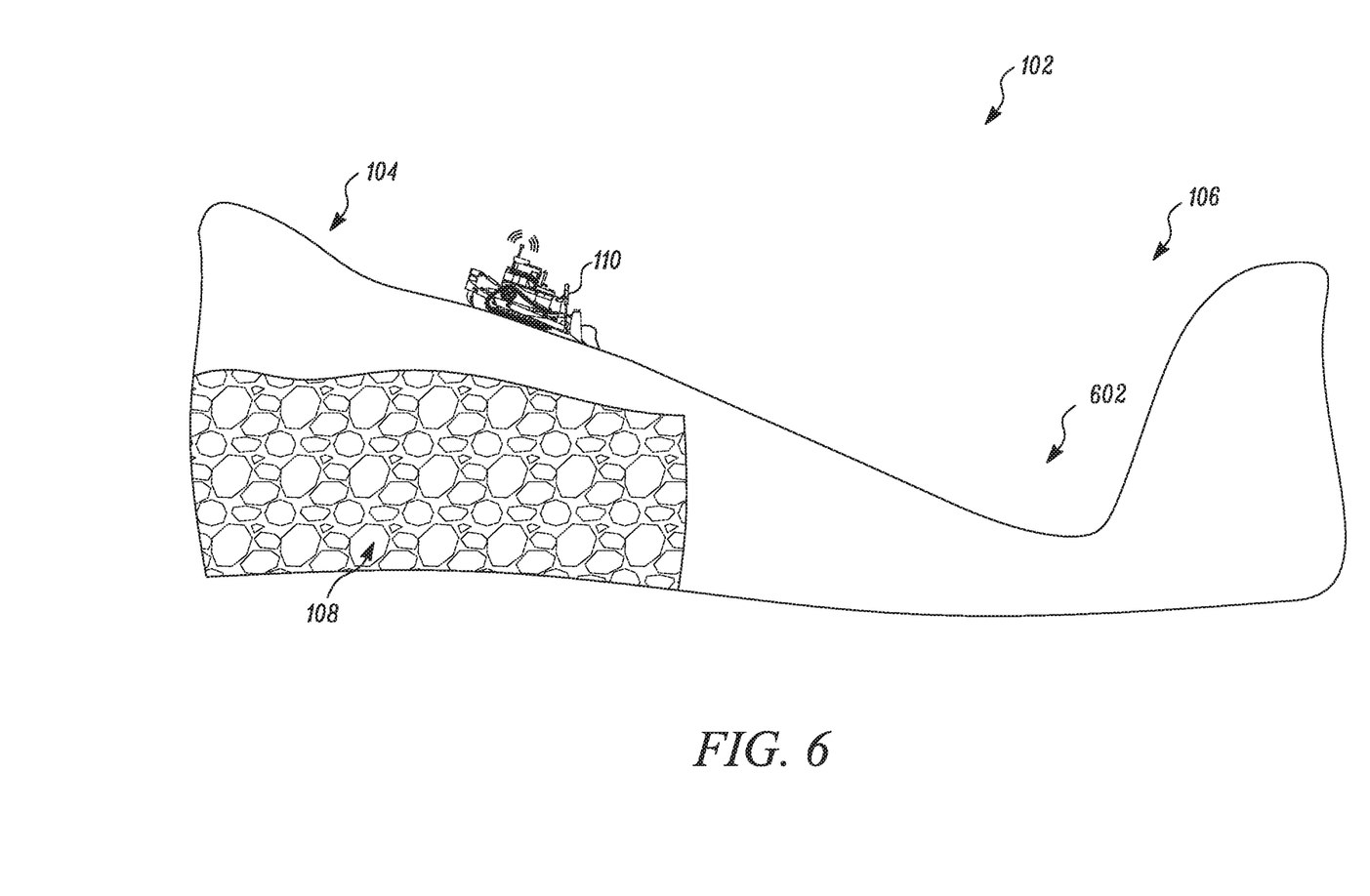
FIG. 6 illustrates an exemplary scenario illustrating the process of filling of a valley in a dump region, in accordance with the concepts of the present disclosure.

A person having ordinary skill in the art would appreciate that, initially, the dump region 106 may include a valley 602 (refer FIG. 6). As the machine 110 is operated by the controller 308 to deposit the earth material in the valley 602, the valley 602 gets filled with the earth material. Therefore, after enough earth material has been deposited in the valley 602 (in the dump region 106), the terrain of the dump region 106 is levelled (depicted by 702). In an embodiment, levelling of the dump region 106 may correspond to a state beyond which if further earth material is deposited in the dump region 106, then the incline 202 is formed.

Thereafter, the controller 308 may be configured to detect whether the terrain of the dump region 106 is levelled (depicted by 702). In an embodiment, the controller 308 may utilize one or more known technologies to determine whether the terrain in the dump region 106 is levelled. For example, the controller 308 may utilize the one or more sensors 314 to determine whether the terrain in the dump region 106 is levelled based on the elevation data captured by the one or more sensors 314. In certain embodiments, the controller 308 may be configured to receive an input from an operator of the machine 110 pertaining to the information whether the terrain of the dump region 106 is levelled.

Figure 7:
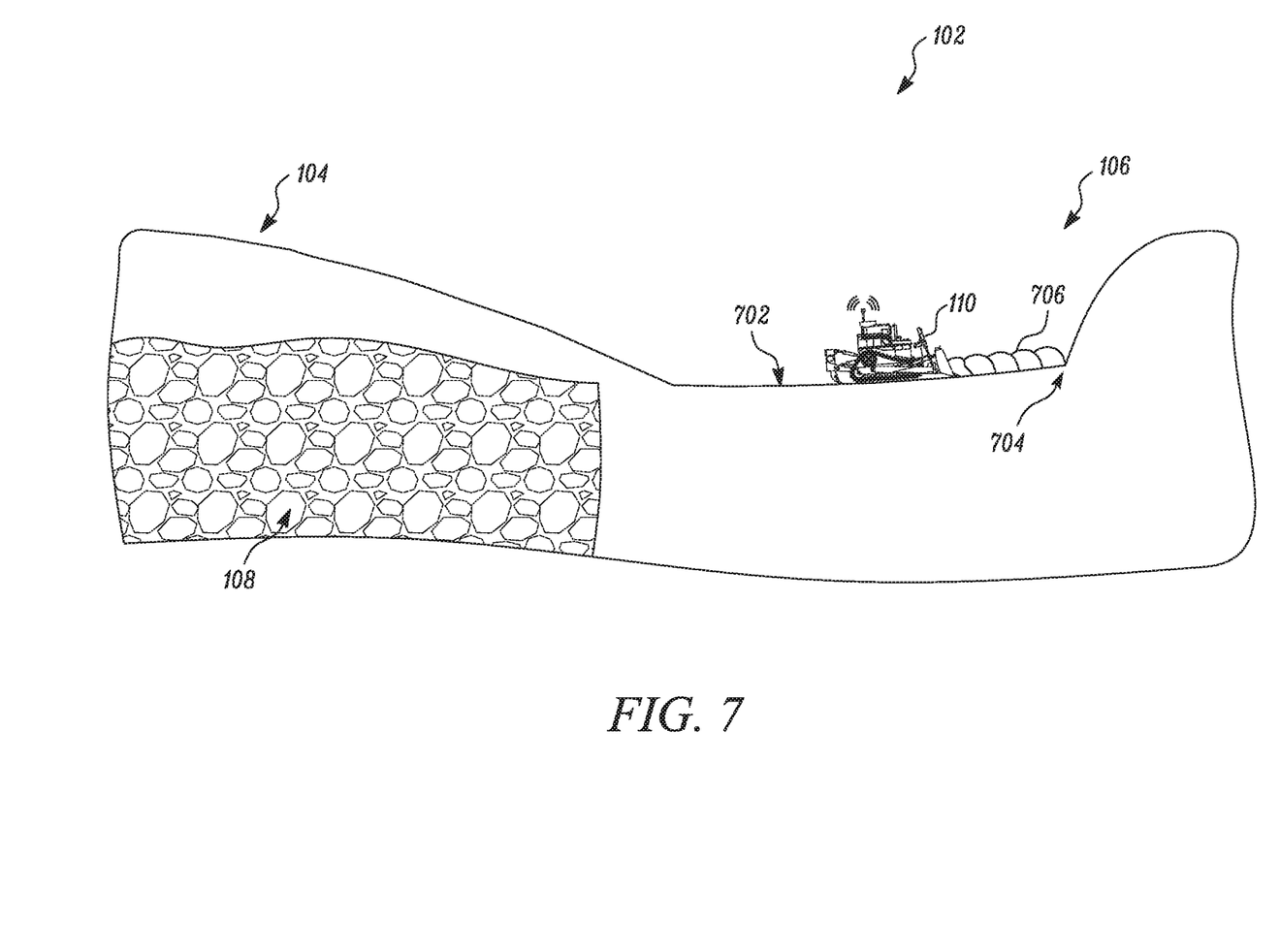
FIG. 7 illustrates an exemplary scenario illustrating the process of formation of incline in the dump region, in accordance with the concepts of the present disclosure.

After the determination that the terrain of the dump region 106 is levelled, the controller 308 may be configured to operate the machine 110 such that the machine 110 pushes the earth material (removed from the overburden region 104) to a farthest point 704 (refer FIG. 7) in the dump region 106 to form a plurality of piles 706 (refer FIG. 7). Thereafter, the plurality of piles 706 is compacted to form a new surface in the dump region 106. This operation is repeated until all the earth material from the overburden region 104 is removed. As multiple surfaces are formed on top of each other in the dump region 106, the elevation of the terrain in the dump region 106 increases. For example, the incline 202, with the positive slope, is formed in the dump region 106. Further, the incline 202 defines the pivot point 204 that corresponds to a location on the incline 202 that has a minimum elevation in comparison with the elevation of other locations on the incline 202.

In an embodiment, the controller 308 may be configured to receive an input, from the operator of the machine 110 or through some other input device, to set/define the location of the pivot point 204. Further, the controller 308 is configured to store the location of the pivot point 204 in the memory device 310. In certain embodiments, the controller 308 may be configured to automatically determine the location of the pivot point 204. For example, the controller 308 may be configured to monitor the elevation of the terrain of the work zone 102 during the operation of the machine 110 in the work zone 102. To monitor the elevation of the terrain of the work zone 102, the controller 308 is configured to instruct the one or more sensors 314 to detect the elevation of the terrain of the work zone 102. For example, during traversal of the machine 110, the controller 308 may instruct the one or more sensors 314 to detect the elevation of the machine 110 itself at one or more predetermined locations on the work zone 102. In an embodiment, the elevation of the machine 110 is directly proportional to the elevation of the terrain in the work zone 102. Therefore, by determining the elevation of the machine 110 at the one or more predetermined locations, the controller 308 may be configured to determine the elevation of the terrain of the work zone 102 at the one or more predetermined locations. Further, the controller 308 is configured to store the elevation determined at the one or more predetermined location on the work zone 102 in the memory device 310 as the elevation data. Based on the elevation data, the controller 308 may determine a location on the incline 202 that has minimum elevation in comparison to the elevation at the other locations on the incline 202. The controller 308 may set the pivot point to be at the determined location (represented by 204). This first pivot point, whether user entered or automatically detected, may be referred to as the initial pivot point.

After the determination of the initial pivot point 204, the controller 308 may operate the machine 110 in such a manner that when the machine 110 traverses towards the incline 202 from the overburden region 104, the controller 308 actuates the implement 302 to lift the implement 302 at a predefined distance from the initial pivot point 204. Such operation of lifting the implement 302 avoids the implement 302 from getting stuck in the surface of the incline 202.

Figure 8:
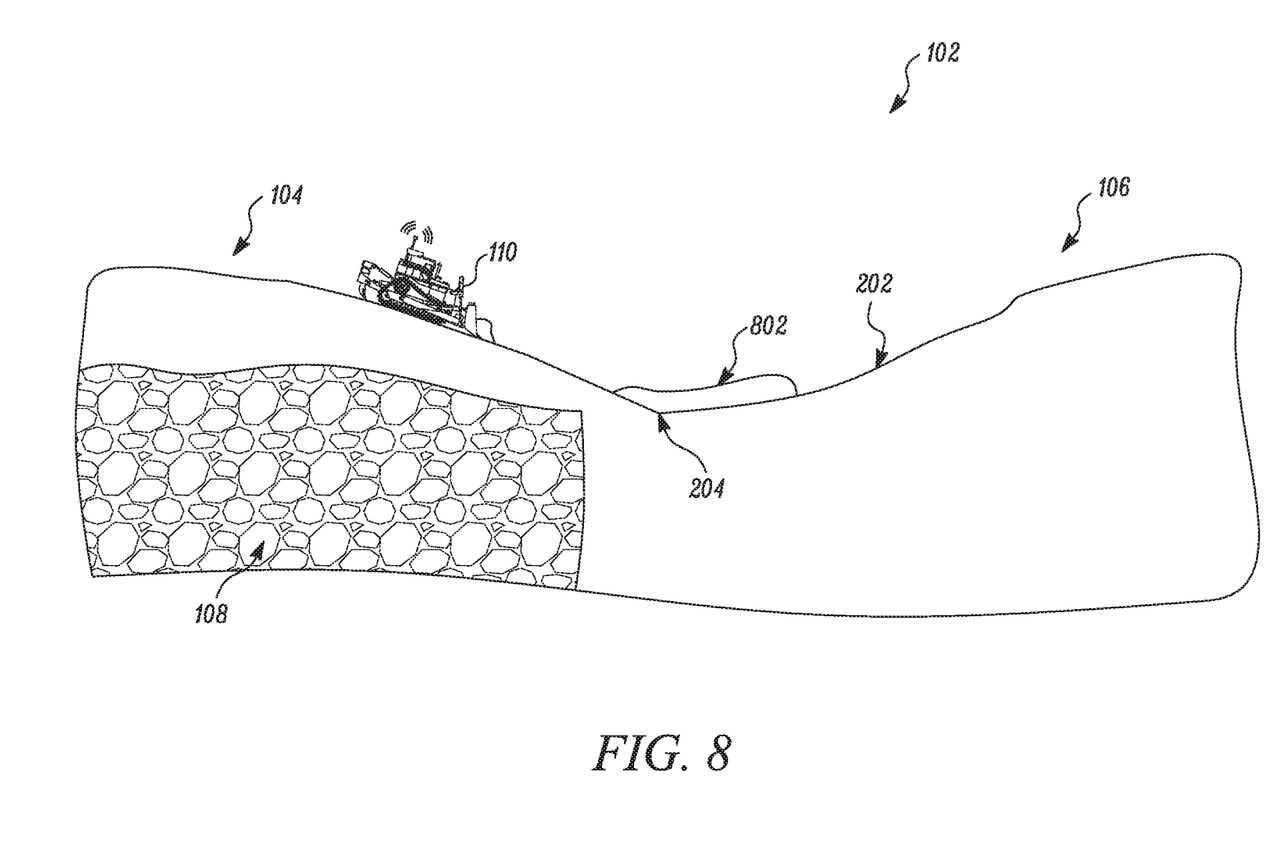
FIG. 8 illustrates an exemplary scenario illustrating shedding of earth material around pivot point, in accordance with the concepts of the present disclosure.
Figure 9:
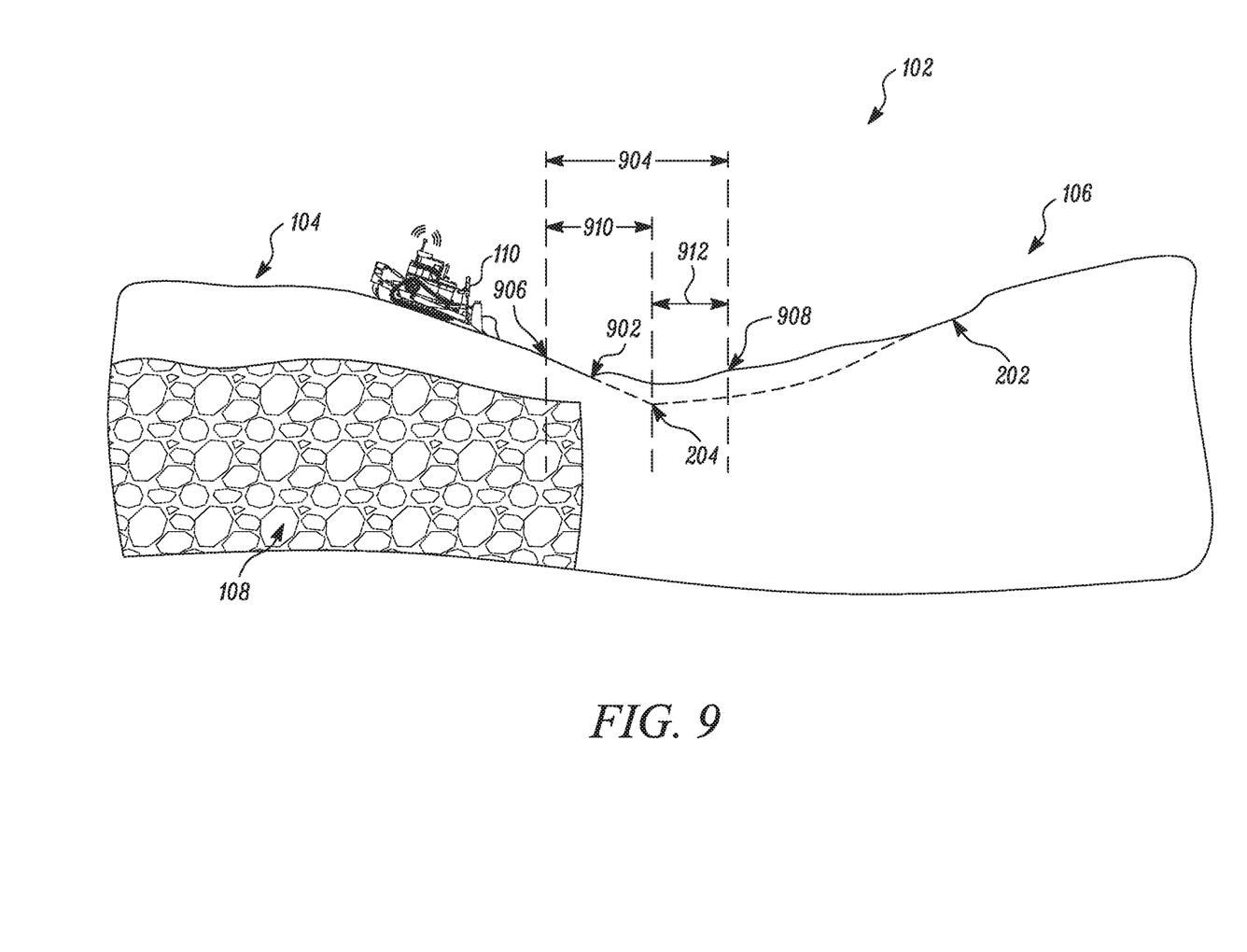
FIG. 9 illustrates an exemplary scenario illustrating the process of shifting of start point of the incline in a work zone, in accordance with the concepts of the present disclosure.

Lifting of the implement 302 at the predefined distance from the initial pivot point 204 causes shedding of the earth material (represented by 802) near the initial pivot point 204. As a result, with each iteration of depositing the earth material in the dump region 106, the amount of earth material deposited around the initial pivot point 204 increases. This may cause the start point of the incline 202 to shift from the initial pivot point 204 (as depicted by 902).

Referring back to FIG. 4, at step 404, it is determined whether the start point of the incline 202 has shifted. In an embodiment, the controller 308 is configured to determine whether the start point of the incline 202 has shifted. In an embodiment, the controller 308 determines a count of trips made by the machine 110 to carry the earth material from the overburden region 104 to the dump region 106 since the initial pivot point 204 was defined. Thereafter, the controller 308 compares the count of the trips with the threshold value of trips. If the controller 308 determines that the count of the trips has exceeded the threshold value of the trips, the controller 308 may determine that the start point of the incline 202 might have shifted from the initial pivot point 204. Subsequently, the controller 308 performs the step 406. If the controller 308 determines that the count of the trips is below the threshold value of the trips, the controller 308 may determine that the start point of the incline 202 is the same and, accordingly, the controller 308 operates the machine 110 in accordance with the initial pivot point 204 (as described in the step 402).

A person having ordinary skill in the art would appreciate that the scope of the disclosure is not limited to determining an updated start point of the incline 202 based on the count of trips made by the machine 110. In an embodiment, the controller 308 may be configured to determine the shift in the start point of the incline 202 based on the elevation data of the terrain of the work zone 102. In such a scenario, the controller 308 may instruct the one or more sensors 314 to record the elevation data continuously during the operation of the machine 110 in the work zone 102. Based on the elevation data, the controller 308 may determine the change/shift in the start point of the incline 202. For example, from the elevation data, the controller 308 may determine the elevation at the initial pivot point 204. After determining the elevation at the initial pivot point 204, the controller 308 may compare the elevation at the initial pivot point 204 with a threshold value of elevation. If the elevation at the initial pivot point exceeds the threshold value of elevation, the controller 308 may determine that the elevation at the initial pivot point 204 has increased and the start point of the incline 202 has shifted.

In yet another embodiment, the controller 308 may, in real time, instruct the one or more sensors 314 to monitor the elevation and the location of the machine 110 in the work zone 102. Based on the real-time data obtained from the one or more sensors 314, the controller 308 may determine whether the machine 110 is operating on the incline 202. In an embodiment, the controller 308 may be configured to monitor pitch, roll, and yaw parameters (determined based on the data received from the one or more sensors 314) of the machine 110 to determine whether the machine 110 is operating on the incline 202. A person having ordinary skill in the art would appreciate that the pitch, roll, and yaw parameters of the machine is indicative of the orientation of the machine 110. Further, the person having ordinary skill in the art would understand that the orientation of the machine 110 will change when the machine 110 operates on the incline 202. Therefore, the controller 308 utilizes the pitch, roll, and yaw parameters to determine the orientation of the machine 110 and, accordingly, determines whether the machine 110 is operating on the incline 202.

Concurrently, the controller 308 may be configured to determine the location of the machine 110. Based on the location of the machine 110 and the orientation of the machine 110, the controller 308 may determine whether the machine 110 is operating on the incline 202 prior to have reached the initial pivot point 204. If the controller 308 determines that the machine 110 is operating of the incline 202 prior to the machine 110 reaching the initial pivot point 204, the controller 308 may determine that the start point of the incline 202 has shifted.

In yet another embodiment, the controller 308 may detect the shift in the start point of the incline 202 by detecting an interaction between the implement 302 and the surface of the incline 202. As discussed above, the implement 302 of the machine 110 may get stuck in surface of the incline 202 due to change in the elevation of the incline 202. As the controller 308 operates the machine 110 according the initial pivot point 204, therefore, if the start point of incline 202 shifts, there is a possibility that implement 302 of the machine 110 may get stuck in the surface of the incline 202. Therefore, the controller 308 may detect this event (of the implement 302 getting stuck in the surface of the incline 202) to determine that the start point of the incline 202 has shifted. In an embodiment, the controller 308 may utilize proximity sensors or shock sensors to detect such an event.

In yet another embodiment, the controller 308 may utilize one or more image sensors and image processing techniques to determine the shift in the start point of the incline 202. In such a scenario, the controller 308 may be configured to periodically capture the image of the work zone 102 using one or more image capturing devices such as, but not limited to, cameras, and LIDAR sensors. Thereafter, the controller 308 may be configured to compare the images of the work zone 102 to determine whether the start point of the incline 202 has shifted. The controller 308 may utilize one or more known image processing techniques to compare the images.

A person having ordinary skill in the art would appreciate that the scope of the disclosure should not be limited to aforementioned techniques to detect the shift in the start point of the incline 202. In an embodiment, the controller 308 may employ other known techniques to determine the shift in the start point of the incline 202. Further, the controller 308 may utilize the combination of the aforementioned technologies to accurately determine the shift in the start point of the incline 202.

If it is determined at step 404 that the start point of the incline 202 has shifted, then at step 406, the elevation of the terrain of the work zone 102 is monitored. In an embodiment, the controller 308 is configured to monitor the elevation of the terrain of the work zone 102. As discussed above, the controller 308 may instruct the one or more sensors 314 to monitor the elevation of the terrain of the work zone 102 as the machine 110 traverses through the work zone 102. The one or more sensors 314 are configured to determine the elevation at one or more predetermined locations in the work zone 102. The controller 308 is configured to store the elevation determined by the one or more sensors 314 as the elevation data in the memory device 310. In an embodiment, the controller 308 may be configured to generate a graph that represents the value of the elevation at the one or more predetermined locations in the work zone 102. In an embodiment, the controller 308 may be configured to display the graph to the operator of the machine 110 on a display device.

At step 408, based on the elevation data, a location in the work zone 102 that has an elevation lower than the elevation at the initial pivot point 204, is detected. In an embodiment, the controller 308 is configured to detect the location having the elevation lower than the elevation at the initial pivot point 204. The detection of the location in the work zone 102 has been further described in conjunction with FIG. 5.

Figure 5:
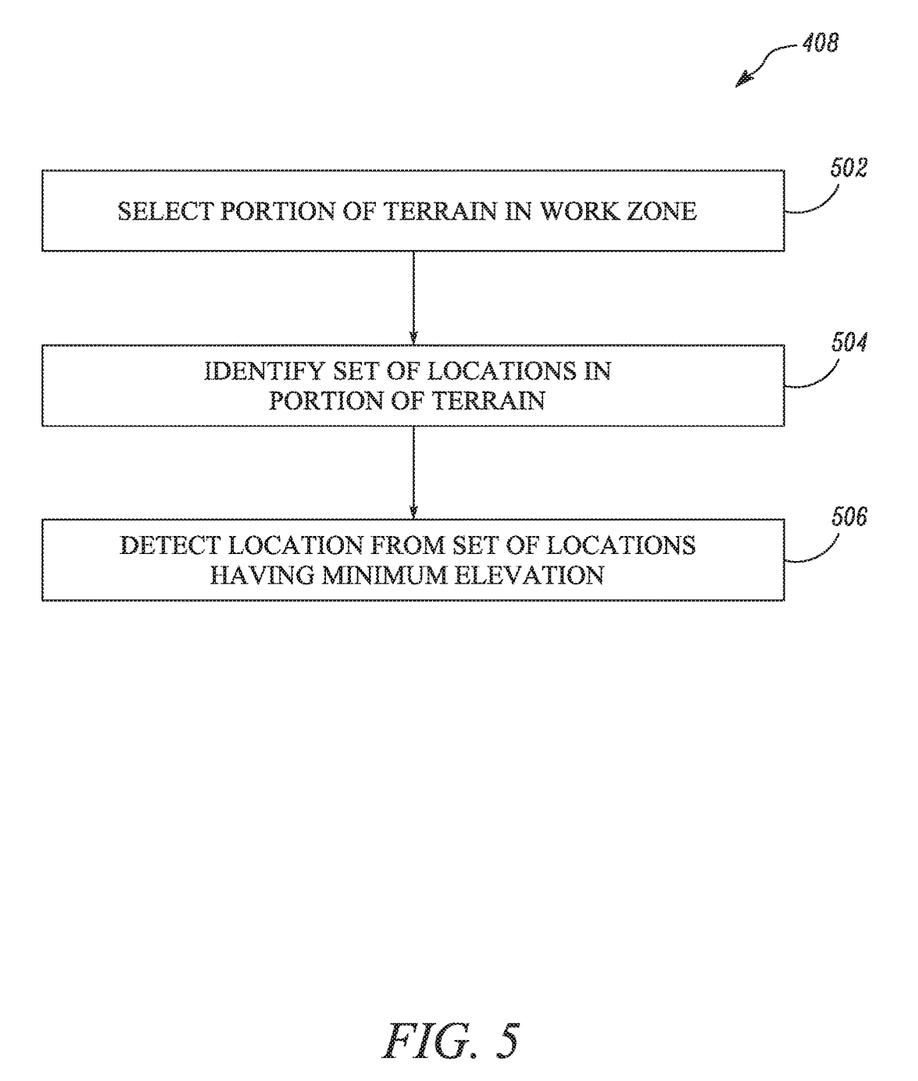
FIG. 5 illustrates a flowchart of a method to detect a location in the work zone, in accordance with the concepts of the present disclosure.

Referring to FIG. 5 a flowchart 408, is illustrated. The flowchart 408 illustrates a method to detect the location in the work zone 102 that has the elevation lower than the elevation at the initial pivot point 204.

At step 502, a portion of terrain in the work zone 102 is selected. In an embodiment, the controller 308 is configured to select the portion of the terrain in the work zone 102. In an embodiment, the controller 308 is configured to define a predetermined window around the initial pivot point 204. In an embodiment, the area (encompassed by the predetermined window) corresponds to the portion of terrain in the work zone 102. Referring to FIG. 9, an exemplary predetermined window 904 has been illustrated. It can be observed that the portion of the terrain of the work zone 102 encompassed by the predetermined window 904 includes the initial pivot point 204. In an embodiment, the predetermined window 904 may have a first end 906 and a second end 908. In an embodiment, the first end 906 of the predetermined window 904 may be defined at a first distance (depicted by 910) from the initial pivot point 204 towards the overburden region 104. In an embodiment, the second end 908 of the predetermined window 904 may be defined at a second distance (depicted by 912) from initial pivot point 204 towards the dump region 106. For example, the first end 906 of the predetermined window 904 is defined at 3 meters from the initial pivot point 204 and the second end 908 of the predetermined window 904 is defined at 1 meter from the initial pivot point 204. Therefore, the total length of the predetermined window 904 is 4 meters. The terrain encompassed by the predetermined window 904 corresponds to the portion of the terrain.

A person having ordinary skill in the art would appreciate that the scope of the disclosure is not limited to the predetermined window 904 having the aforementioned dimensions. In an embodiment, the dimensions of the predetermined window 904 may differ, without departing from the scope of the disclosure. In an embodiment, the operator of the machine 110 may define the dimensions of the predetermined window 904. In such a scenario, the operator may be configured to define the predetermined window 904 based on the graph (illustrating the elevation of the terrain of the work zone 102) being displayed on the display screen. In an embodiment, the controller 308 may be configured to receive the input, pertaining to the dimensions and location of the predetermined window 904, from the operator.

After, selecting the portion of the terrain, the controller 308 is configured to extract the elevation data, pertaining to the portion of the terrain, from the elevation data of the work zone 102 (stored in the memory device 310). A person having ordinary skill in the art would appreciate that the elevation data of the portion of the terrain may include elevation data of a set of locations in the portion of the terrain.

At step 504, the controller 308 is configured to identify the set of locations the location in the portion of the terrain of the work zone 102. Further, the controller 308 is configured to extract the elevation data pertaining to the set of locations in the portion of terrain from the memory device 310.

At step 506, the controller 308 is configured to detect the location from the set of locations that has a minimum elevation in comparison to the elevation of the other locations in the set of locations.

For example, the portion of the work zone 102 includes the set of locations $L_1, L_2, \ldots, L_{10}$ having elevation $E_1, E_2$, and $E_{10}$, respectively. For instance, the controller 308 determines that the location $L_4$ has the minimum elevation in comparison to the elevation of the locations $L_1, L_2, L_{10}$. Accordingly, the controller 308 selects the location $L_4$ as the new pivot point 902.

A person having ordinary skill in art would appreciate that the scope of the disclosure is not limited to detecting the location having minimum elevation among each location in the set of locations. In an embodiment, to detect the location having the elevation lower than the elevation of the initial pivot point 204, the controller 308 may identify a first set of locations from the set of locations that have an elevation less than the elevation at the initial pivot point 204.

Thereafter, the controller 308 is configured to determine a difference between the elevation of each location in the first set of locations with the elevation of the initial pivot point 204. Subsequently, the controller 308 is configured to compare the elevation of each location in the first set of locations with a predefined threshold value to determine whether the difference of elevation associated with each location is less than the predefined threshold value. The locations in the first set of locations, for which the difference is less than predefined threshold elevation value, are selected as a second set of locations.

Thereafter, the controller 308 is configured to select the location from the second set of locations. In an embodiment, the controller 308 is configured to identify the location (depicted by 902) from the second set of locations that has a minimum elevation among the elevation of each location in the second set of locations.

For example, the portion of the work zone 102 includes the set of locations $L_1, L_2, \ldots, L_{10}$ having elevation $E_1, E_2$, and $E_{10}$, respectively. The controller 308 may determine a first set of locations from the set of locations having elevation less than the elevation at the initial pivot point 204. For instance, the controller 308 determines that the locations $L_2$, $L_4, L_6, L_8$, and $L_{10}$ have elevation less than the elevation at the initial pivot point 204. Therefore, the controller 308 selects the locations $L_2, L_4, L_6, L_8$, and $L_{10}$ as the first set of locations. Thereafter, the controller 308 determines the difference in the elevation at the locations, in the first set of locations, (i.e., $L_2, L_4, L_6, L_8$, and $L_{10}$) with the elevation at the initial pivot point 204. For instance, the controller 308 determines that the difference in the elevation associated with the locations $L_2, L_4, L_6, L_8$, and $L_{10}$ are $D_1, D_2, D_3, D_4$, and $D_5$, respectively. Thereafter, the controller 308 determines whether the difference determined for each location in the first set of locations is less than a threshold value. For instance, the controller 308 determines that the difference associated with the locations $L_2$, and $L_6$ is less than the threshold value. Thereafter, the controller 308 selects the locations $L_2$, and $L_6$ as the second set of locations. Thereafter, the controller 308 determines, which among the locations $L_2$, and $L_6$ have minimum elevation. For instance, the controller 308 determines that the location $L_6$ has the minimum elevation. Therefore, the controller 308 selects L6 as the new pivot point 902.

Referring back to FIG. 4, at step 410, the controller 308 performs a check to determine whether the detected location (in step 408) is within a predetermined distance from the initial pivot point 204. If it is determined by the controller 308 that the first location is within the predetermined distance, at step 412, the controller 308 is configured to select the detected location as the new pivot point 902. Else the controller 308 repeats the step 408. In an embodiment, the predetermined distance may vary from a range from 5 meters to 10 meters from the initial pivot point 204.

Based on the updated/new pivot point 902, the controller 308 is configured to operate the machine 110. For example, the controller 308 is configured to lift the implement 302 of the machine 110 at the predefined distance from the updated pivot point 902.

The disclosed embodiments allow the controller 308 to periodically check if the start point of the incline 202 has shifted. Accordingly, the controller 308 is configured to update the pivot point to the new start point of the incline 202. This allows the controller 308 to alter the operation of the machine 110 in accordance to the new pivot point 902 so that the machine 110 can compensate for the elevation of the incline 202. For example, the implement 302 of the machine 110 may be lifted prior to reaching the new pivot point 902 so that the collision of the implement 302 with the surface of the incline 202 may be avoided.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for monitoring a work zone in a worksite, the work zone including an overburden region, a dump region having an incline of positive slope, and an initial pivot point at a junction of the overburden region and the incline, the method comprising:
monitoring, by a controller, an elevation of the work zone based on an elevation data received from one or more sensors;
detecting, by the controller, a location in the work zone having an elevation lower than an elevation of the initial pivot point based on the elevation data; and
updating, by the controller, the detected location as a new pivot point if the detected location is within a predetermined distance from the initial pivot point.

2. The method of claim 1, wherein the one or more sensors are positioned on a machine operating in the work zone.

3. The method of claim 2 further comprising measuring the elevation data associated with the work zone by the one or more sensors, during traversing of the machine in the work zone.

4. The method of claim 1, wherein the predetermined distance from the initial pivot point varies in a range from 5 m to 10 m.

5. The method of claim 1, wherein the detection of the location further comprises identifying, by the controller, first set of locations having an elevation lower than the elevation of the initial pivot point.

6. The method of claim 5, wherein the detection of the location further comprises determining, by the controller, a difference between the elevation of each of the first set of locations and the elevation at the initial pivot point.

7. The method of claim 6, wherein the detection of the location further comprises selecting, by the controller, the location from the first set of locations based on the determined difference and a threshold elevation value.

8. A method for operating a machine in a work zone in a worksite, the work zone including an overburden region, a dump region having an incline of positive slope, and an initial pivot point at a junction of the overburden region and the incline, the method comprising:
manipulating, by a controller in the machine, an implement of the machine at a predefined distance from the initial pivot point, to compensate for an elevation of the incline;
monitoring, by the controller, an elevation of the work zone based on an elevation data received from one or more sensors positioned on the machine;
detecting, by the controller, a location in the work zone having an elevation lower than an elevation of the initial pivot point based on the elevation data; and
updating, by the controller, the detected location as a new pivot point if the detected location is within a predetermined distance from the initial pivot point; and
manipulating, by the controller, the implement at the predefined distance from the new pivot point.

9. The method of claim 8, wherein the detection of the location further comprises identifying, by the controller, first set of locations having an elevation lower than the elevation of the initial pivot point.

10. The method of claim 9, wherein the detection of the location further comprises determining, by the controller, a difference between the elevation of each of the first set of locations and the elevation of the initial pivot point.

11. The method of claim 10, wherein the detection of the location further comprises selecting, by the controller, the location from the first set of locations based on the determined difference and a threshold elevation value.

12. The method of claim 8, wherein the predetermined distance from the initial pivot point varies in a range from 5 m to 10 m.

13. A system for monitoring a work zone in a worksite, the work zone including an overburden region, a dump region having an incline of positive slope, and an initial pivot point at a junction of the overburden region and the incline, the system comprising:
one or more sensors configured to measure an elevation data of the work zone; and
a controller, communicably coupled to the one or more sensors, configured to:
monitor an elevation of the work zone based on the elevation data,
detect a location having an elevation lower than an elevation of the initial pivot point, based on the elevation data, and
update the detected location as a new pivot point if the detected location is within a predetermined distance from the initial pivot point.

14. The system of claim 13, wherein the controller is further configured to identify first set of locations having an elevation lower than the elevation of the initial pivot point.

15. The system of claim 14, wherein the controller is further configured to determine a difference between the elevation of each of the first set of locations and the elevation of the initial pivot point.

16. The system of claim 15, wherein the controller is further configured to select the location from the first set of locations based on the determined difference and a threshold elevation value.

17. The system of claim 13, wherein the predetermined distance from the initial pivot point varies in a range from 5 m to 10 m.

* * * * *